United States Patent Office 3,651,120
Patented Mar. 21, 1972

3,651,120
POLYFLUOROISOALKOXYALKYL SULFURIC
ACIDS AND SALTS THEREOF
Louis Gene Anello, Basking Ridge, and Richard Francis
Sweeney, Dover, N.J., assignors to Allied Chemical
Corporation, New York, N.Y.
No Drawing. Filed Feb. 27, 1969, Ser. No. 803,120
Int. Cl. C07c 141/02
U.S. Cl. 260—458                        13 Claims

ABSTRACT OF THE DISCLOSURE

Novel sulfuric acid compounds characterized by having a polyfluoroisoalkoxyalkyl tail wherein an ether oxygen links a fluorinated carbon atom attached to two fluorinated alkyl groups and at least one —$CF_2$— group, and their metal, ammonium and substituted ammonium salts. These acids and salts are useful as surface active agents.

---

This invention relates to novel fluorocarbon sulfuric acids and salts thereof. More particularly, this invention relates to polyfluoroisoalkoxyalkyl sulfuric acids and salts thereof useful as surface active agents.

We have discovered novel fluorocarbon sulfuric acids and derivatives thereof having the formula

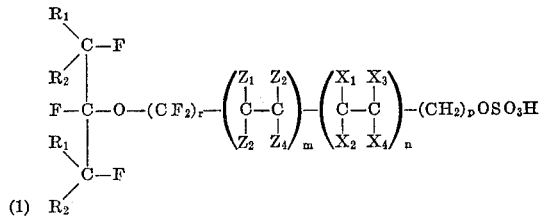

(1)

wherein $R_1$ and $R_2$ independently at each occurrence can be fluorine, chlorine, perfluoroalkyl or together can form a cyclic perfluoroalkylene group, with the proviso that $R_1$ and $R_2$ cannot both be chlorine: $Z_1$, $Z_2$, $Z_3$ and $Z_4$ independently can be hydrogen, fluorine or chlorine with the proviso that no more than two of $Z_1$–$Z_4$ are chlorine; $X_1$, $X_2$, $X_3$ and $X_4$ independently can be hydrogen, fluorine or chlorine with the proviso that no more than one of $X_1$–$X_4$ is chlorine; $r$ is an integer from 1–2; $m$ and $n$ are integers from 0–75; the sum of $m$ and $n$ is 0–75; $p$ is an integer from 0–1 with the proviso that when $p$ is 0, $n$ must be at least one and $X_3$ and $X_4$ must be hydrogen, and their metal, ammonium and substituted ammonium salts. The acids and salts of the invention are useful as surface active agents.

The criticality in the structure of the above-described compounds is in the polyfluoroisoalkoxyalkyl tail portion of the molecule wherein an ether oxygen atom links a fluorinated carbon atom attached to two fluoroalkyl groups and at least one —$CF_2$— group.

The polyfluoroisoalkoxyalkyl-substituted sulfuric acids and salts of the invention can be prepared by reacting an alcohol having the formula

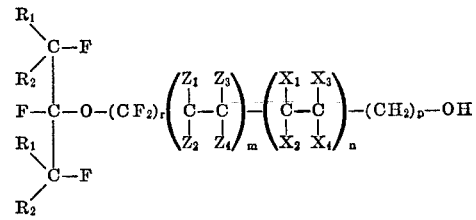

(2)

wherein $R_1$, $R_2$, $Z_1$–$Z_4$, $X_1$–$X_4$, $m$, $n$, $p$, and $r$ have the meanings given above, with a sulfonating agent to prepare the corresponding sulfuric acids. The sulfuric acid compounds can be further reacted with a metal salt or a nitrogenous base to form the corresponding sulfuric acid salt.

The alcohols of Formula 2 can be prepared from polyfluoroisoalkoxyalkyl iodides having the formula

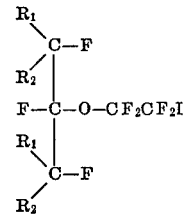

(3)

wherein $R_1$ and $R_2$ have the meanings given above. These iodides are prepared by reacting an appropriate ketone with an ionizable fluoride salt, e.g., CsF or KF to form a fluorinated organic salt which is reacted with tetrafluoroethylene and iodine. These reactions are described in copending applications of Litt et al., Ser. No. 492,276, filed Oct. 1, 1965, now U.S. Patent 3,453,333 and Ser. No. 513,574, filed Dec. 13, 1965, now U.S. Pat. 3,470,256. The pertinent subject matter of these applications is hereby incorporated by reference.

The iodides of Formula 3 can be reacted with unsaturated compounds having the formulas $Z_1Z_2C=CZ_3Z_4$ and/or $X_1X_2C=CX_3X_4$ wherein $Z_1$–$Z_4$ and $X_1$–$Z_4$ are as described hereinabove. Suitable unsaturated compounds include for example ethylene, difluoroethylene, difluorochloroethylene, trifluoroethylene, tetrafluoroethylene and the like. These reactions can be initiated by heat, e.g. temperatures from about 100° C. to about 350° C., preferably from about 150–200° C., or by a free radical initiator, e.g., azobisisobutyronitrile, benzoyl peroxide and the like. These reactions are described in greater detail in copending application of Anello et al. Ser. No. 633,359 filed April 25, 1967, now U.S. Patent 3,514,487. The pertinent subject matter of this application is hereby incorporated by reference.

The preparation of the polyfluoroisoalkoxyalkyl iodides can be further illustrated by the following equations:

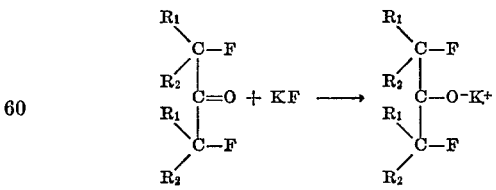

2.

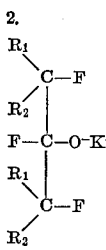 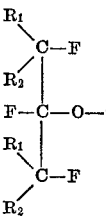

$$F-\overset{R_1}{\underset{R_2}{C-F}}-O^-K^+ + CF_2=CF_2 + I_2 \longrightarrow F-\overset{R_1}{\underset{R_2}{C-F}}-O-CF_2CF_2I + KI$$

3.

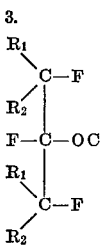

$$F-\overset{R_1}{\underset{R_2}{C}}-OCF_2CF_2I + mZ_1Z_2C=CZ_3Z_4 \longrightarrow$$

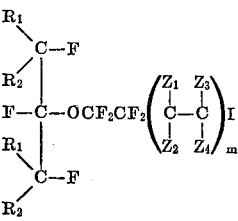

4.

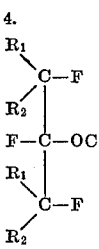

$$F-\overset{R_1}{\underset{R_2}{C}}-OCF_2CF_2\begin{pmatrix}Z_1 & Z_3 \\ | & | \\ C-C \\ | & | \\ Z_2 & Z_4\end{pmatrix}_m I + nX_1X_2C=CX_3X_4 \longrightarrow$$

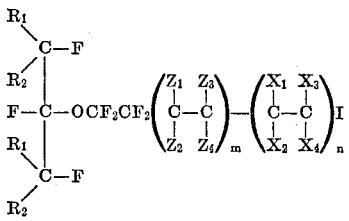

It will be appreciated that when $m$ and/or $n$ is 0, the appropriate Equation 3 and/or 4 is omitted.

The preferred class of alcohols for use in the invention have the formula (4)

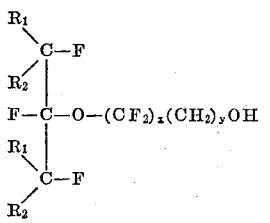

wherein $R_1$ and $R_2$ can be fluorine, chlorine or perfluoroalkyl of 1–2 carbon atoms providing both $R_1$ and $R_2$ are not chlorine, and $x$ and $y$ are integers from 1–20.

Depending upon the values of $x$ and $y$, the preferred methods of preparing the alcohols from the iodides will vary.

When $x$ in Formula 4 is an odd integer from 1–19 and $y$ is 1, an alkyl iodide wherein $x$ is 2–20 and $y$ is 0 can be reacted with $SO_3$ to form a mixture of the acyl halide and perhaloalkoxyfluoroalkyl pyrosulfuryl fluoride; this mixture can be reacted with an alcohol to form the corresponding ester; and this ester can be reduced to the desired alcohol with $LiAlN_4$:

When $x$ in Formula 4 is an even integer from 2–20 and $y$ is 1, an iodide having two terminal —$CH_2$— groups can be reacted with alcoholic KOH to form an ethene; the ethene can be oxidized with $KMnO_4$ to an acid; the acid can be esterified with an alkanol; and the ester can be reduced to the desired alcohol with $LiAlH_4$.

When $x$ in Formula 4 is an even integer from 2–20, and $y$ is odd or even from 3–20, the appropriate fluoro iodide can be reacted with an alkyl alcohol of the formula $CH_2=CH(CH_2)_{y-2}OH$ to form the corresponding iodo alcohol which can be reduced to the desired alcohol with zinc and alcohol.

When $x$ in Formula 4 is an even integer from 2–20 and $y$ is 1–3, the iodide can be reacted with $SO_3$ to form the pyrosulfate or with oleum to form the hydrosulfate; and the pyrosulfate or hydrosulfate can be hydrolyzed with aqueous acid to form the desired alcohol.

When $x$ is Formula 4 is an odd integer from 1 to 19 and $y$ is an odd or even integer from 3 to 20, the iodide can be reacted to form an acid having an odd number of —$CF_2$— groups, the acid can be reacted first with silver oxide and then with elemental iodine to form a perhaloisoalkoxyperfluoroalkyl iodide; the iodide can be reacted with an unsaturated alcohol of the formula $$CH_2=CH(CH_2)_{y-2}OH$$

and the resultant iodoalcohol can be reduced to the desired alcohol with zinc and alcohol.

The alcohols and methods of preparing them are described in greater detail in copending application of Anello et al., Ser. No. 721,089, filed Apr. 12, 1968, now abandoned. Mixtures of more than one alcohol can be employed in the invention.

The reaction between the polyfluoroisoalkoxyalkyl alcohol as described above and the sulfonating agent is often exothermic and can be carried out at low or moderate temperatures, e.g., from about $-20°$ to about $50°$ C. However, higher temperatures, up to about $150°$ C., can also be employed and can increase the rate of reaction.

Suitable sulfonating agents for use in the invention are well known and include sulfuric acid, fuming sulfuric acid, sulfuric anhydride, chlorosulfonic acid and the like. At least a stoichiometric amount of the sulfonating agent is required for complete reaction, but an excess is preferred.

An inert solvent can be employed if desired, but is not necessary, particularly when an excess of the sulfonating agent is present. Suitable solvents include for example saturated aliphatic or alicyclic hyrocarbons such as hexane, decane, kerosene, cyclohexane and the like; and halogenated hydrocarbons such as chloroform, carbon tetrachloride, 1,1,1-trichloroethane and the like, and other inert solvents such as carbon disulfide.

The free polyfluoroisoalkoxyalkyl sulfuric acids can be isolated from the reaction mixture and purified in known manner, as by vacuum distillation. They can also be isolated by precipitating their corresponding barium salts and adding a quantitative amount of sulfuric acid. The sulfuric acids of the invention are sirupy, hydroscopic liquids, strongly acidic and soluble in water.

The metal salts of the sulfuric acids of the invention can be isolated by reacting the reaction mixture with a suitable metal salt. Suitable metal compounds include the hydroxides, acetates, carbonates or sulfates of various metals including those of Group 1$a$ of the Periodic Table, the alkali metals such as lithium, potassium and sodium; those of Group 1$b$ such as copper and silver; those of Group II$a$, the alkaline earth metals such as beryllium, magnesium, calcium, strontium and barium; those of Group II$b$ such as zinc, cadmium and mercury; Group III metals such as aluminum; Group IV metals such as tin, lead and titanium; Group VIII metals such as iron, cobalt and nickel. The metal salt or an aqueous solution of a salt can be added to an organic solution of the sulfuric acid product in a suitable solvent such as diethyl ether. The metal salts are solids and are soluble in water. These salts can be purified if desired by recrystallization from a suitable solvent, such as ethanol or isopropanol.

Ammonium and substituted ammonium salts can also be readily prepared by reacting the sulfuric acids of the invention with a suitable nitrogen-containing compound. Preferably, the sulfuric acid product is dissolved in a suitable solvent, such as ether or alcohol, and a nitrogenous base added to this solution.

Nitrogenous bases suitable for use in the invention are well known and include ammonia, amines and amino acids.

Suitable amines include alkyl-substituted amines such as methylamine, ethylamine, diethylamine, trimethylamine, n-propylamine, n-hexylamine, methyldiethylamine and the like; hydroxyalkyl-substituted amines such as ethanolamine, diethanolamine, triethanolamine and the like; cycloalkyl-substituted amines such as cyclohexylamine, butylethylcyclohexylamine, dicyclohexylamine and the like; aromatic amines such as aniline, methylaniline, dimethylaniline, diethylaniline, o-, m-, and p-toluidine o- and p-anisidine, p-phenetidine, diphenylamine, triphenylamine and the like; and heterocyclic amines such as pyridine, lutidine, colidine, $\alpha$-, $\beta$- and $\gamma$-picolines, quinoline, carbazole and the like.

Suitable amino acids include those having the formula $R_4NH_2COOH$ wherein $R_4$ is an alkyl or alkaryl radical of 1–8 carbon atoms. These amino acids include for example glycine, alanine, leucine, isoleucine, valine, phenylalanine and the like.

When a solid compound is obtained as product, the salt will precipitate and can be collected and recrystallized from a suitable solvent if desired. Liquid or oily products can be separated from the reaction mixture by distillation, addition of a nonsolvent to the mixture and the like, as will be known to one skilled in the art.

The sulfuric acids and salts of the invention are useful as surface-active agents at low concentrations. When added to water or aqueous solutions, the compounds lower surface tension materially. They can also be added to organic solution to lower surface tension. Such solutions include hydrocarbon solvents such as benzene, toluene or xylene; halogenated hydrocarbons such as trichloroethane or carbon tetrachloride; and solvents such as dimethylformamide and dimethylsulfoxide. The sulfuric acids and salts of the invention are also useful as leveling agents in wax formulations; stabilizing agents in water-hydrocarbon emulsions; wetting agents in dye solutions to improve dyeing of fibers, and foaming agents. They increase the solubility, detergency and wetting properties of aqueous and organic solutions. The sulfuric acid salts of the invention are useful as textile treating agents to impart oil repellency.

The invention can be illustrated further by the following examples, but it is to be understood that the invention is not meant to be limited by the details disclosed therein. In the examples, all parts and percentages are by weight unless otherwise noted.

EXAMPLE 1

4-heptafluoroisopropoxy-3,3,4,4-tetrafluorobutyl iodide (38 parts) were charged to a vessel fitted with a stirrer, dropping funnel, thermometer and condenser. Stabilized $SO_3$ (38 parts) was added slowly while maintaining the temperature at 35–40° C. Iodine was precipitated. The mixture was heated at 70° C. for 2 hours to complete conversion to the pyrosulfate. The mixture was cooled to room temperature and 100 parts by volume of 35% sulfuric acid was added slowly to hydrolyze the pyrosulfate to the alcohol. A small amount of $Na_2SO_3$ was added to remove elemental iodine and the mixture heated at 105° C. for 1 hour. Two layers formed on standing. The aqueous layer was extracted with ether and the extract combined with the organic layer. The organic mixture was distilled through a spinning band column.

A 70% yield of 4-heptafluoroisopropoxy-3,3,4,4-tetrafluorobutyl alcohol was recovered having a boiling point of 84° C./59 mm.

Elemental analysis.—Calculated for $C_7F_{11}H_5O_2$ (percent): C, 25.5; F, 63.3; H, 1.6. Found (percent): C, 24.9; F, 62.6; H, 1.6.

Fifty-one and one-half parts of the alcohol prepared as above were charged to a vessel and 18.2 parts of chlorosulfuric acid added, maintaining the mixture at 30–40° C. When the evolution of hydrogen chloride ceased, the mixture was distilled.

Forty - six parts of 4 - heptafluoroisopropoxy - 3,3,4,4-tetrafluorobutyl sulfuric acid having the formula

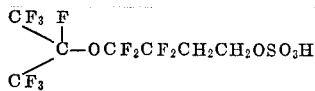

were recovered having a boiling point of 105–110° C./1 mm.

Elemental analysis.—Calculated for $C_7F_{11}H_5SO_5$ (percent): C, 20.5; F, 51.0; H, 1.2; S, 7.8. Found (percent): C, 21.0; F, 51.6, H, 1.4; S, 7.3.

EXAMPLE 2

Two hundred parts of 20% oleum were charged to a vessel fitted with a heater, stirrer, dropping funnel, thermometer and condenser and heated to 90° C. 100 parts of 6 - heptafluoroisopropoxy-3,3,4,4,5,5,6,6-octafluoro-1-hexyl iodide were added over a 15 minute period maintaining the temperature at 90–100° C. After stirring for one hour, the mixture was cooled to 250° C. 840 parts of pater were added slowly while the temperature rose to 70° C. The mixture was heated at 100° C. for 16 hours and washed with sodium thiosulfate to neutralize elemental iodine. The oily layer was separated, dried and distilled.

A 63% yield (50.2 parts) of 6-heptafluoroisopropoxy-3,3,4,4,5,5,6,6 - octafluoro - 1 - hexanol was recovered having a boiling point of 63° C./4 mm.

Elemental analysis.—Calculated for $C_9F_{15}H_5O_2$ (percent): C, 25.1; F, 66.3; H, 1.2. Found (percent): C, 24.5; F, 66.4; H, 1.2.

Following the procedure of Example 1, 8 parts of chlorosulfuric acid were added to 20 parts of the alcohol prepared as above. The mixture was heated at 110–120° C. under reduced pressure of 1 mm. to remove the unreacted starting materials.

Twenty-two parts of 6-heptafluoroisopropoxy-3,3,4,4,5,5,6,6-octafluorohexyl sulfuric acid having the formula

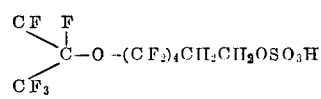

were obtained.

Elemental analysis.—Calculated for $C_9F_{15}H_5SO_5$ (percent): C, 21.2; F, 55.9; H, 1.0; S, 6.3. Found (percent): C, 20.6; F, 57.0; H, 1.1; S, 6.3.

EXAMPLE 3

Forty years of the alcohol prepared in Example 1 were reacted with 14.1 parts of chlorosulfonic acid as in Example 1. 120 parts of diethyl ether were added to solubilize the sulfate and anhydrous ammonia was bubbled through the solution until precipitation was complete. The precipitated salt was taken up in ethanol and filtered. The solvent was evaporated.

Thirty parts of the solid ammonium salt having the formula

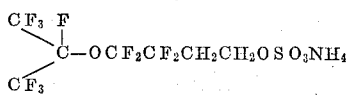

were recovered.

*Elemental analysis.*—Calculated for $C_7F_{11}H_8NSO_5$ (percent): C, 19.7; F, 48.9; H, 1.9; N, 3.3; S, 7.5. Found (percent): C, 19.3; F, 47.8; H, 2.0; N, 3.5; S, 8.0.

EXAMPLE 4

Ten parts of 4-heptafluoroisopropoxy - 3,3,4,4 - tetrafluorobutyl sulfuric acid as obtained in Example 1 were neutralized with dilute aqueous sodium hydroxide solution. The precipitated salt was recrystallized from isopropanol. The product has the formula

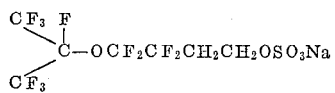

*Elemental analysis.*—Calculated for $C_7F_{11}H_4SO_5Na$ (percent): C, 19.4; F, 48.4; H, 0.9; S, 7.4. Found (percent): C, 20.1; F, 48.8; H, 1.0; S, 7.8.

EXAMPLE 5

4-heptafluoroisopropoxy - 3,3,4,4 - tetrafluorobutyl sulfuric acid (38 parts) as obtained in Example 1 were charged to a vessel and 14 parts of diethyl amine added slowly. The mixture was heated at 65° C. for 2 hours. The product mixture was heated under reduced pressure to remove unreacted starting materials and volatiles.

Fourteen parts of the diethyl ammonium salt having the formula

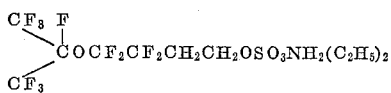

were recovered as an amber-colored oil.

*Elemental analysis.*—Calculated for $C_{11}F_{11}H_{16}NSO_4$ (percent): C, 28.3; F, 44.8; H, 3.4; N, 3.0. Found (percent): C, 28.2; F, 43.9; H, 3.9; N, 2.9.

EXAMPLE 6

Ten parts of 4 - heptafluoroisopropoxy - 3,3,4,4-tetrafluorobutyl sulfuric acid were dissolved in 45 parts by volume of absolute ethanol and 2.4 parts of glycine were added. The mixture was heated at 75° C. for 3 hours, cooled and filtered.

Eight parts of the glycine salt having the formula

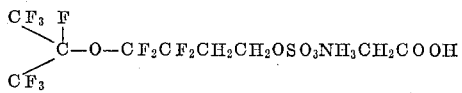

were recovered as an amber-colored oil.

*Elemental analysis.*—Calculated for $C_9F_{11}H_{10}NSO_7$ (percent): C, 21.9; F, 43.1; H, 2.1; S, 6.6. Found (percent): C, 22.1; F, 42.8; H, 2.2; S, 7.0.

EXAMPLE 7

6-Heptafluoroisopropoxy - 3,3,4,4,5,5,6,6 - octafluorohexyl sulfuric acid (5 parts) prepared as in Example 2 were dissolved in diethyl ether and neutralized with dilute aqueous sodium hydroxide solution. The precipitated salt was recrystallized from isopropanol.

The solid product had the formula

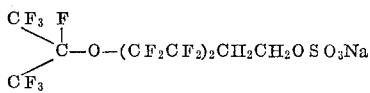

*Elemental analysis.*—Calculated for $C_9F_{15}H_4SO_5Na$ (percent): C, 20.3; F, 53.6; H, 0.8; S, 6.1. Found (percent): C, 20.8; F, 54.1; H, 0.8; S, 6.3.

EXAMPLE 8

Compounds of the invention were tested as surface active agents by measuring the surface tension of aqueous solutions of the compounds at various concentrations at 25° C. according to ASTM test D 1131–156 using a Du Nouy tensiometer. The surface tension of water at 25° C. is 72 dynes/cm. The results are summarized in the table below:

| Compound | Concentration, percent | | | |
|---|---|---|---|---|
| | 1.0 | 0.5 | 0.3 | 0.1 |
| Example 1 | 42.1 | 49.8 | | 50.6 |
| Example 2 | 24.1 | 28.9 | | 34.9 |
| Example 3 | 29.8 | 37.6 | | 52.4 |
| Example 4 | 33.4 | 43.9 | | 64.0 |
| Example 5 | 19.6 | 19.7 | | 24.0 |
| Example 6 | 28.5 | 27.2 | | 27.3 |
| Example 7 | | | 24.4 | 43.1 |

EXAMPLES 9–18

Sulfuric acids and salts of additional polyfluoroisoalkoxyalkyl alcohols are prepared according to procedures described hereinabove and are effective surface active agents. The structural formulas of the acids are set forth below:

Example 9—$(CF_3)_2CFOCF_2CH_2OSO_3H$

Example 10—$(CF_3)_2CFO(CF_2CF_2)_5(CH_2CH_2)_5OSO_3H$

Example 11

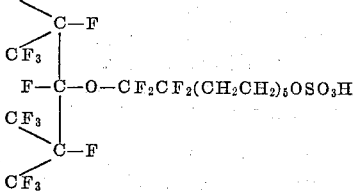

Example 12

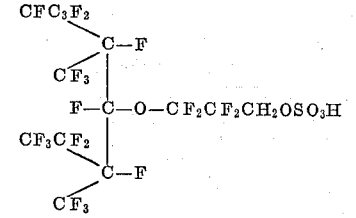

Example 13

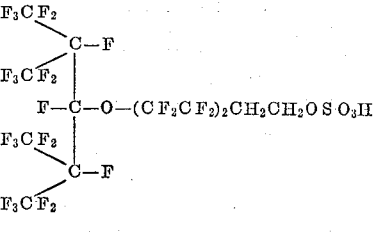

Example 14

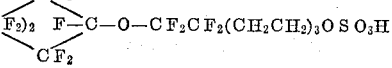

Example 15

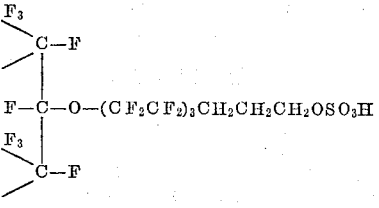

Example 16

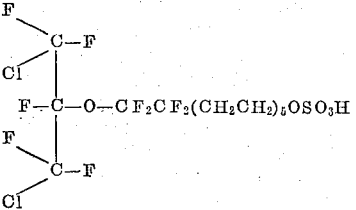

Example 17

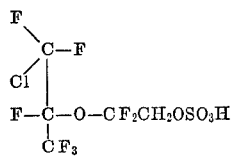

Example 18—$(CF_3)_2CFO(CF_2CF_2)_4CH_2OSO_3H$

Example 19—

$(CF_3)_2CFOCF_2CF_2(CF_2CFCl)_2CH_2CH_2OSO_3H$

Examples 20–25—Typical metal salts of a typical sulfuric acid of the invention are prepared following the procedure of Example 4, substituting an appropriate metal salt. The structures are given below.

Example 20—$(CF_3)_2CFOCF_2CF_2CH_2CH_2OSO_3Ag$
Example 21—$[(CF_3)_2CFOCF_2CF_2CH_2CH_2OSO_3]_2Ca$
Example 22—$[(CF_3)_2CFOCF_2CF_2CH_2CH_2OSO_3]_2Zn$
Example 23—$[(CF_3)_2CFOCF_2CF_2CH_2CH_2OSO_3]_3Al$
Example 24—$[(CF_3)_2CFOCF_2CF_2CH_2CH_2OSO_3]_2Pb$
Example 25—$[(CF_3)_2CFOCF_2CF_2CH_2CH_2OSO_3]_2Co$ Examples 26–31—Typical substituted ammonium salts of a typical sulfuric acid of the invention are prepared following the procedure of Example 5, substituting an appropriate amine. The structures are given below.

Example 26—$(CF_3)_2CFOCF_2CF_2CH_2CH_2OSO_3NH_3CH_3$
Example 27—

$(CF_3)_2CFOCF_2CF_2CH_2CH_2OSO_3NH(CH_3)_3$

Example 28—

$(CF_3)_2CFOCF_2CF_2CH_2CH_2OSO_3NH(CH_2CH_2OH)_3$

Example 29

Example 30

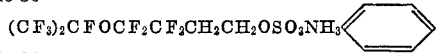

Example 31

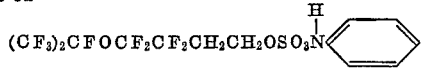

We claim:
1. A compound of the formula

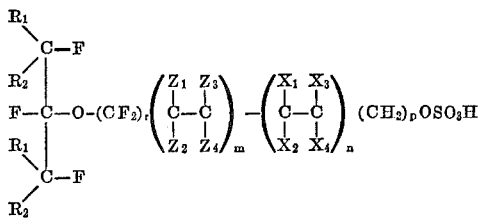

wherein $R_1$ and $R_2$ independently at each occurrence can be fluorine, chlorine, perfluoroalkyl of 1–2 carbon atoms, or together can form a cyclic perfluoroalkylene group with the proviso that $R_1$ and $R_2$ cannot both be chlorine; $Z_1$, $Z_2$, $Z_3$ and $Z_4$ independently can be fluorine, chlorine or hydrogen with the proviso that no more than two of $Z_1$–$Z_4$ are chlorine; $X_1$, $X_2$, $X_3$ and $X_4$ independently can be fluorine, chlorine or hydrogen with the proviso that no more than one of $X_1$–$X_4$ is chlorine; $r$ is an integer from 1 to 2; $m$ and $n$ are integers from 0–75; the sum of $m$ and $n$ is 0–75; $p$ is an integer from 0–1 with the proviso that when $p$ is 0, $n$ must be at least one and $X_3$ and $X_4$ must be hydrogen; and ammonium and metal salts thereof in which the metal is a member selected from the group consisting of alkali metals and alkaline earth metals.

2. A compound according to claim 1 wherein $m$ and $n$ are integers from 0–10.

3. An acid according to claim 1 having the formula

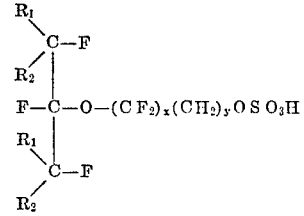

wherein $R_1$ and $R_2$ independently at each occurrence can be fluorine or perfluoroalkyl of 1–2 carbon atoms, $x$ and $y$ are integers from 1–20.

4. A salt of an acid according to claim 3, which is an alkali metal, alkaline earth metal or ammonium salt.

5. An ammonium salt of an acid according to claim 3.

6. A metal salt of an acid according to claim 3 in which the metal is an alkali metal.

7. A metal salt of an acid according to claim 3 in which the metal is an alkaline earth metal.

8. A compound according to claim 1 having the formula $(CF_3)_2CFOCF_2CF_2CH_2CH_2OSO_3H$ 9. A compound according to claim 1 having the formula $(CF_3)_2CFO(CF_2CF_2)_2CH_2CH_2OSO_3H$ 10. A compound according to claim 1 having the formula $(CF_3)_2CFOCF_2CF_2CH_2CH_2OSO_3NH_4$ 11. A compound according to claim 1 having the formula $(CF_3)_2CFOCF_2CF_2CH_2CH_2OSO_3Na$ 12. A compound according to claim 1 having the formula $(CF_3)_2CFOCF_2CF_2CH_2CH_2OSO_3NH_2(C_2H_5)_2$ 13. A compound according to claim 1 having the formula $(CF_3)_2CFO(CF_2CF_2)_2CH_2CH_2OSO_3Na$ References Cited

UNITED STATES PATENTS

| | | | |
|---|---|---|---|
| 3,017,421 | 1/1962 | Cohen | 260—456 |
| 3,052,708 | 9/1962 | Velluz et al. | 260—456 |
| 3,283,012 | 11/1966 | Day | 260—458 X |
| 3,328,454 | 6/1967 | Weil | 260—458 |
| 3,332,978 | 7/1967 | Caldwell | 260—458 |

LEON ZITVER, Primary Examiner

L. B. De Crescente, Assistant Examiner

U.S. Cl. X.R.

8—89; 252—8.7, 161, 353; 260—429 K, 429.7, 429.9, 430, 435 R, 448 R